(No Model.) 7 Sheets—Sheet 4.
E. W. LINDENAU.
EMPLOYEE'S TIME RECORDER.
No. 571,272. Patented Nov. 10, 1896.
Fig. 5.
Fig. 6.
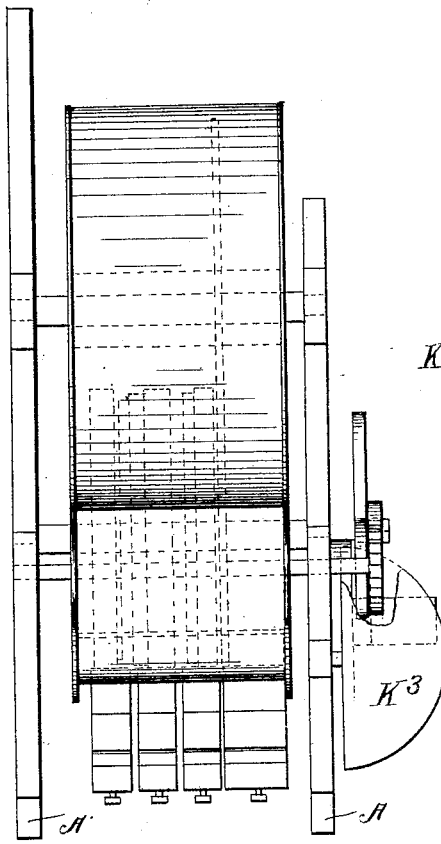
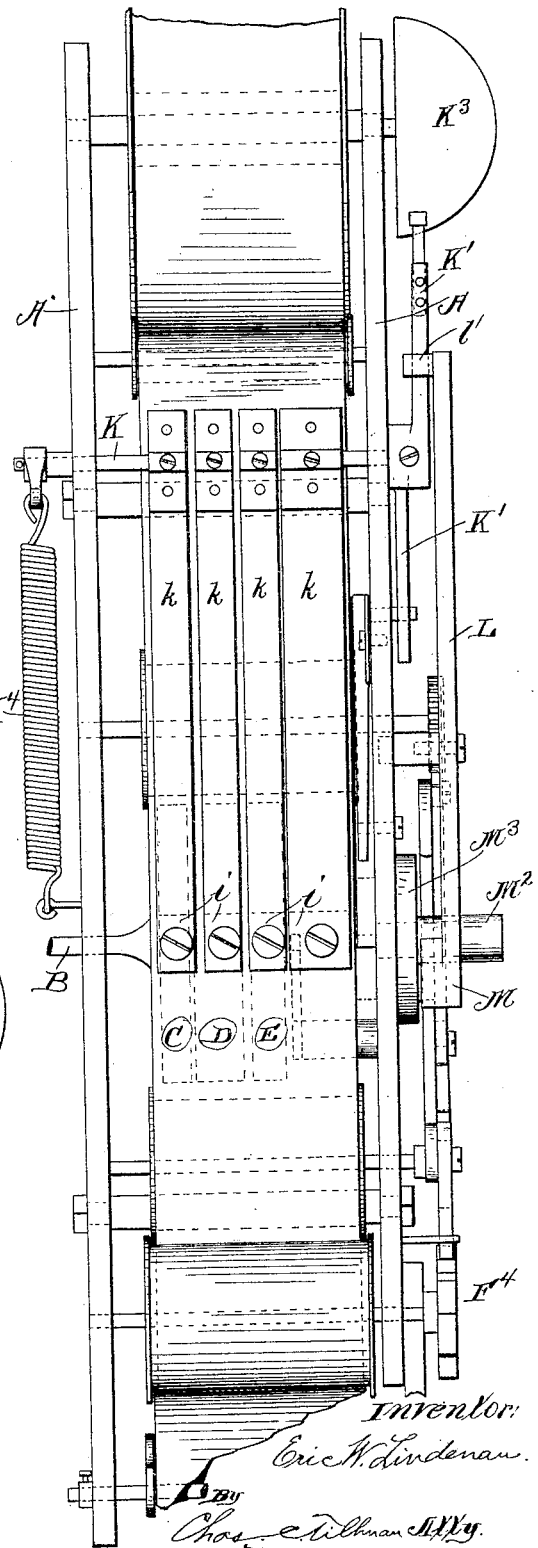
Witnesses:
Chas. E. Gorton
E. A. Duggan
Inventor:
Eric W. Lindenau
By Chas. E. Tillman Atty (No Model.)  
7 Sheets—Sheet 5.

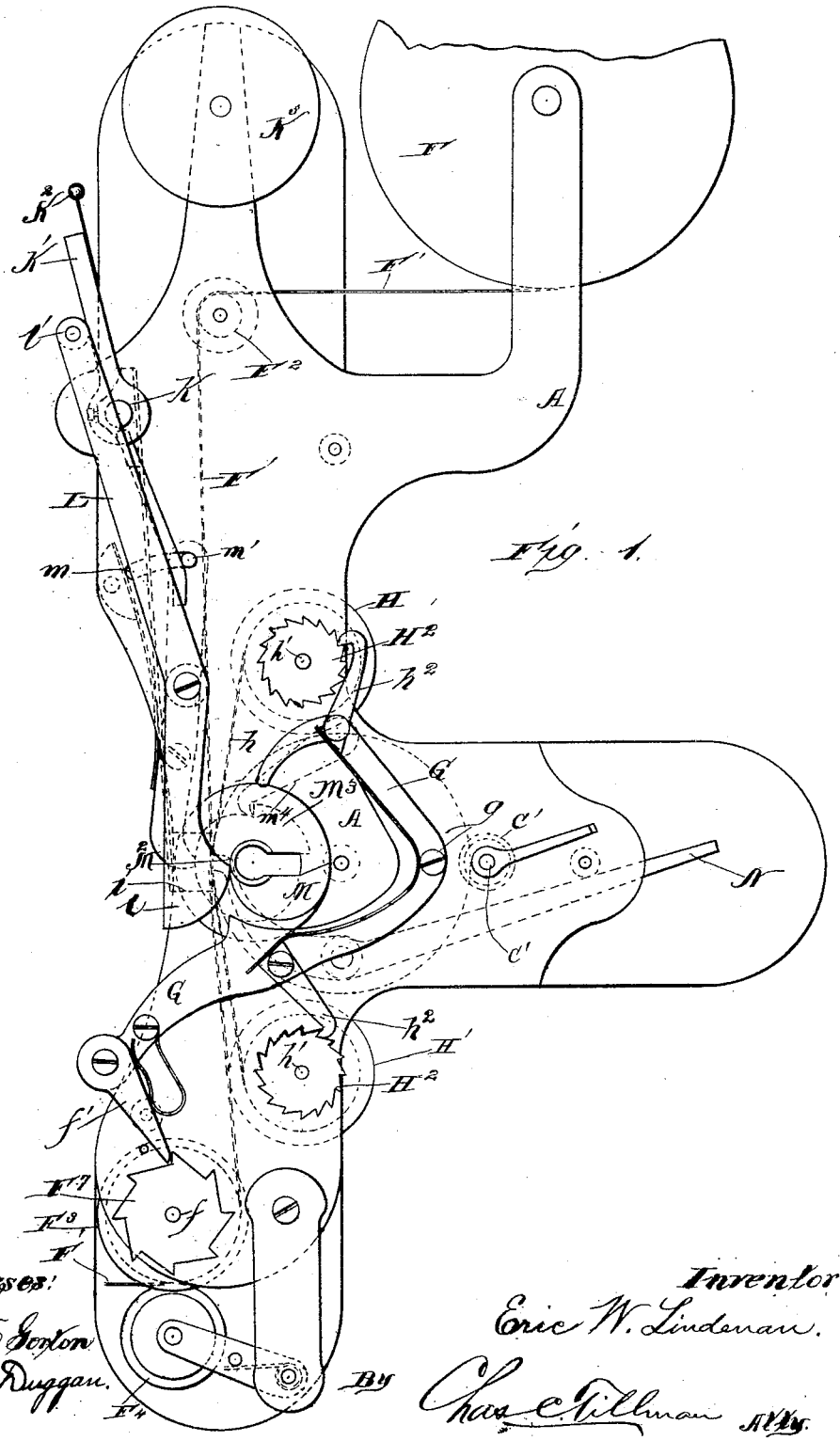

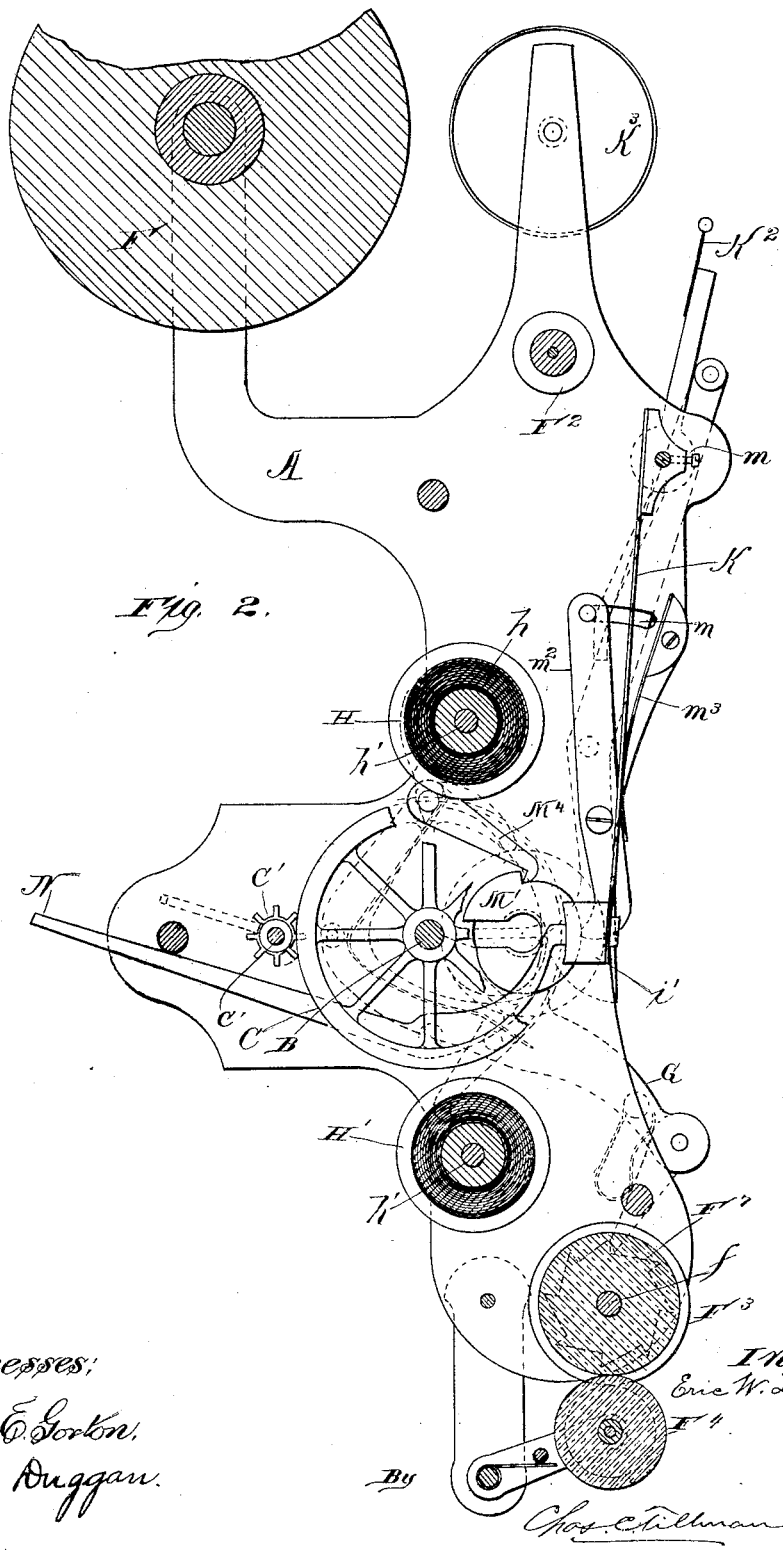

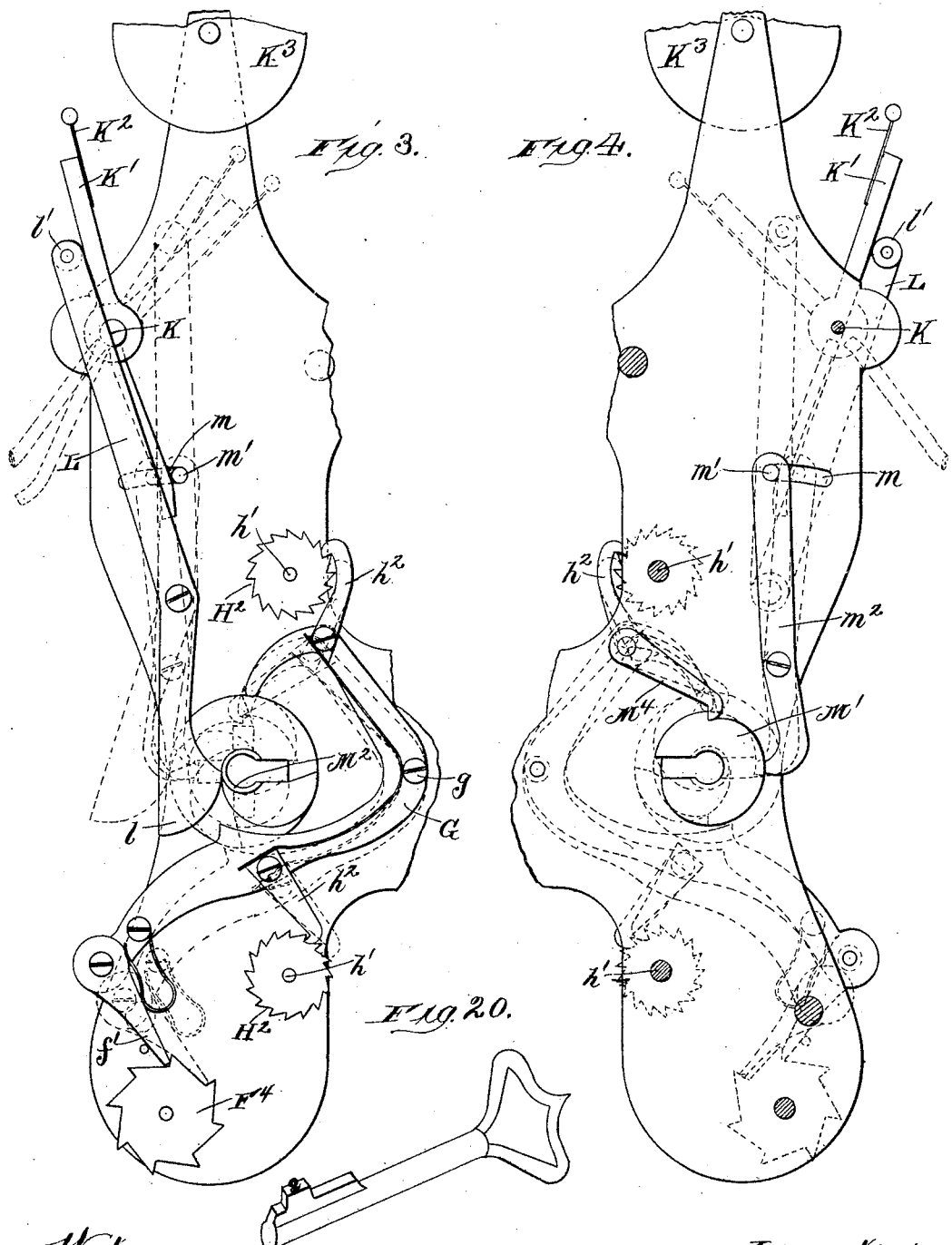

E. W. LINDENAU.
EMPLOYEE'S TIME RECORDER.

No. 571,272. Patented Nov. 10, 1896.

Witnesses:
Chas. E. Gorton.
E. A. Duggan.

Inventor:
Eric W. Lindenau.
By Chas. C. Tillman
Atty.

(No Model.) 7 Sheets—Sheet 6.

E. W. LINDENAU.
EMPLOYEE'S TIME RECORDER.

No. 571,272. Patented Nov. 10, 1896.

Witnesses:
Chas. E. Gorton.
O. A. Duggan.

Inventor:
Eric W. Lindenau.
By Chas. C. Tillman, Atty.

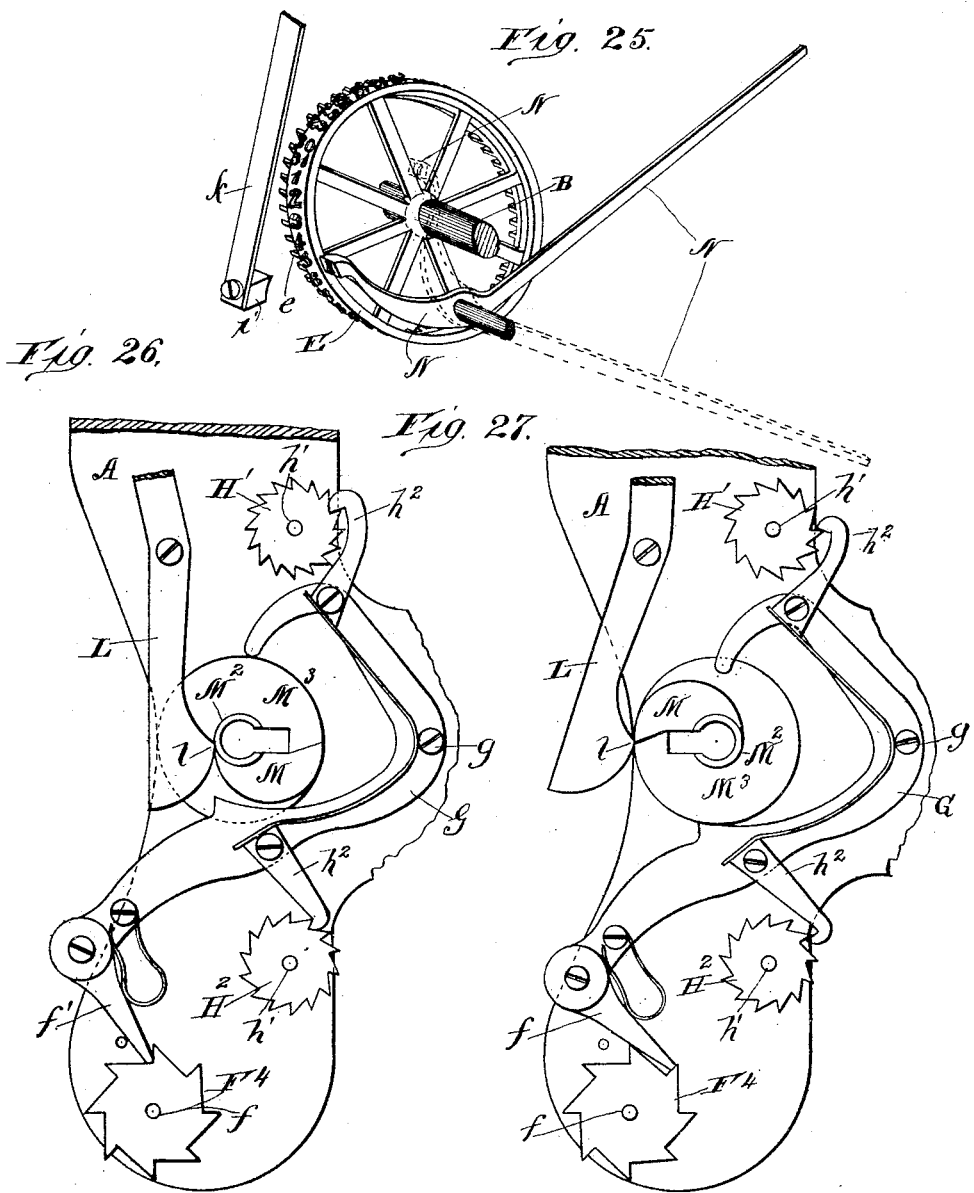

UNITED STATES PATENT OFFICE.

ERIC W. LINDENAU, OF JOLIET, ILLINOIS.

EMPLOYEE'S TIME-RECORDER.

SPECIFICATION forming part of Letters Patent No. 571,272, dated November 10, 1896.

Application filed June 28, 1895. Serial No. 554,336. (No model.)

*To all whom it may concern:*

Be it known that I, ERIC W. LINDENAU, a citizen of the United States, residing at Joliet, in the county of Will and State of Illinois, have invented certain new and useful Improvements in Employees' Time-Registers, of which the following is a specification.

My invention relates to certain improvements in time registers or recorders, and is especially adapted to that class of such devices which are used in large stores or factories to indicate the exact time at which each employee enters upon his duties or work and ceases the same; and it consists in certain peculiarities of the construction, novel arrangement, and operation of the various parts thereof, as will be hereinafter more fully set forth and specifically claimed.

The objects of my invention are, first, to provide a time register or recorder which shall be accurate and effectual in its operation and in which the entry upon duty or the leaving off thereof by any employee may be recorded, thus enabling the employee to place himself on record without the assistance of a timekeeper, and thereby obviating disputes and collusion, and, second, such a device wherein each employee who is known or designated by a specific number shall be provided with a key to the register, having a number thereon to correspond with his number, to insert into the movable keyhole or guide of the register for the operation thereof, and which key cannot be removed therefrom until it has been turned once around, thus recording the number of the employee, the day of the month, the hour, and minute of the day.

In order to enable others skilled in the art to which my invention pertains to make and use the same, I will now proceed to describe it, referring to the accompanying drawings, in which—

Figure 7:
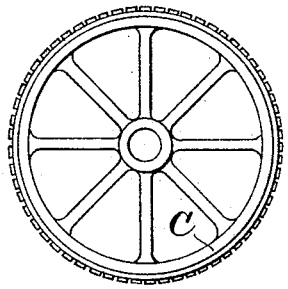
Figure 10:
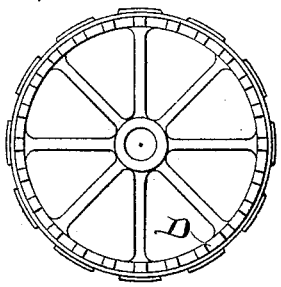
Figure 13:
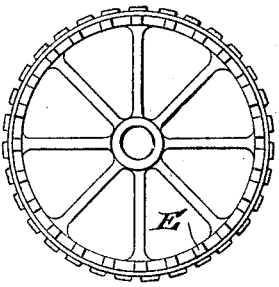
Figure 8:
Figure 11:
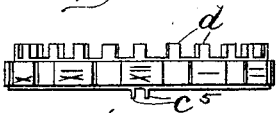
Figure 14:
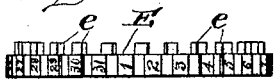
Figure 9:
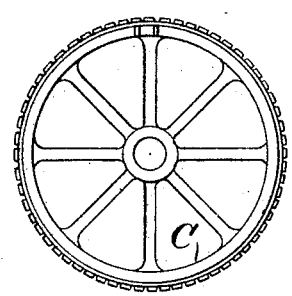
Figure 12:
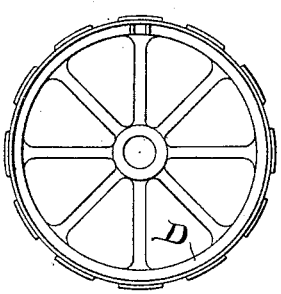
Figure 15:
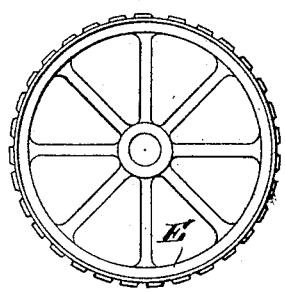
Figure 16:
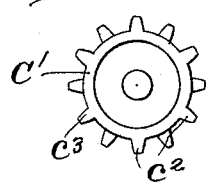
Figure 18:
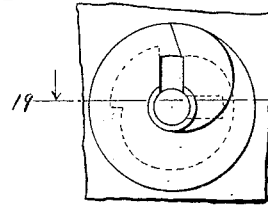
Figure 17:
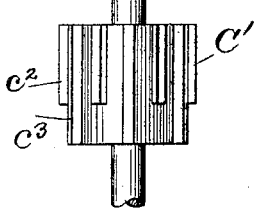
Figure 19:
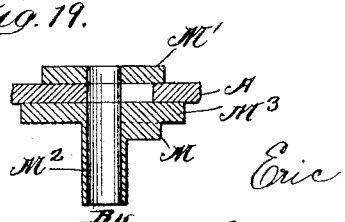
Figure 21:
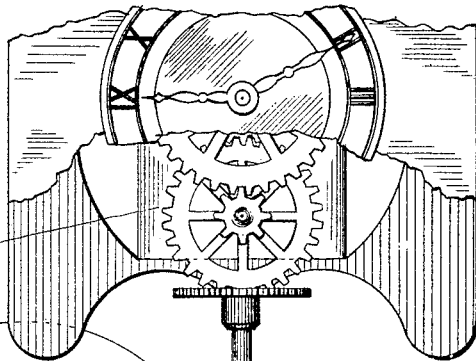
Figure 22:
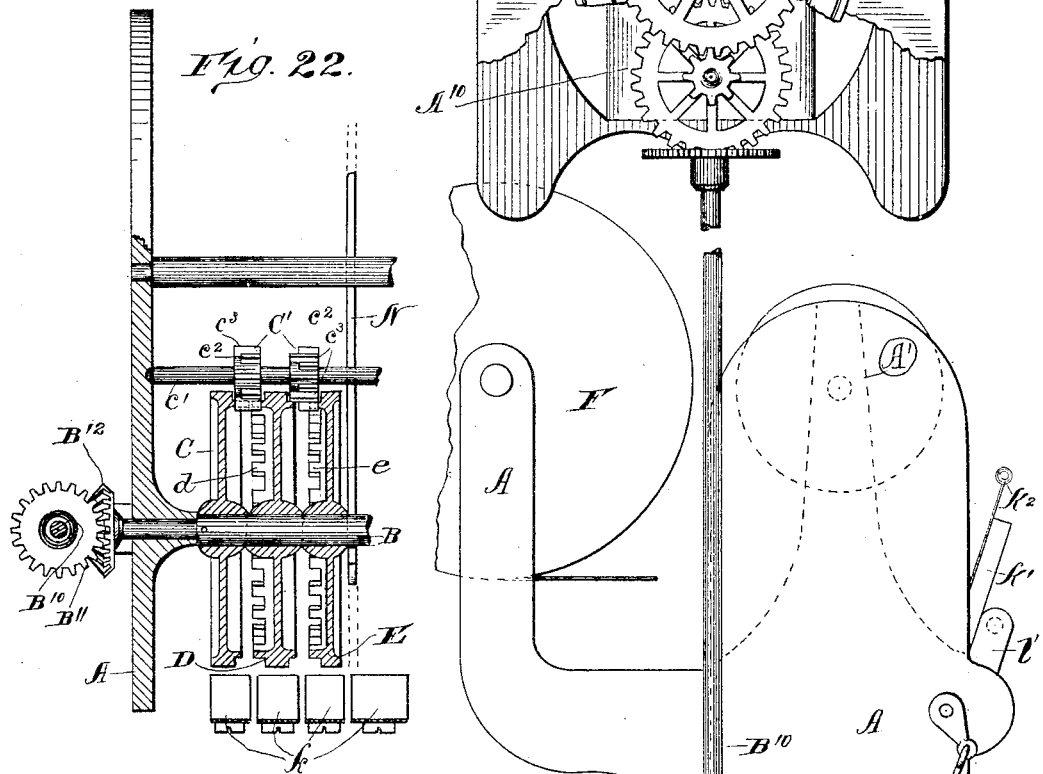
Figure 23:
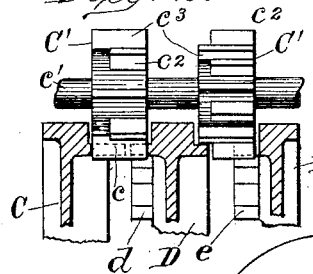
Figure 24:
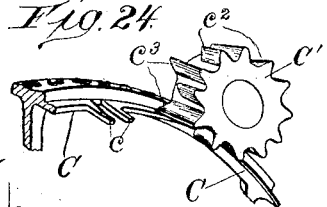

Figure 1 is a front view in elevation of the operating mechanism of the register as it appears when removed from its box or casing and ready to receive the key of the operator or employee. Fig. 2 is a reverse view in elevation, partly in section, thereof. Fig. 3 is a front view in elevation of a portion of the operating mechanism, showing the various positions of the different parts thereof indicated by dotted lines. Fig. 4 is a view in elevation, partly in section, of the reverse side thereof. Fig. 5 is an edge or side view of the operating mechanism detached from its casing or box. Fig. 6 is a plan view thereof. Fig. 7 is a rear view in elevation of the type-carrying minute-wheel. Fig. 8 is a plan view thereof. Fig. 9 is a face or front view of the same in elevation. Fig. 10 is a rear view in elevation of the type-carrying hour-wheel. Fig. 11 is a plan view thereof. Fig. 12 is a face or front view in elevation of the same. Fig. 13 is a rear view in elevation of the type-carrying day-wheel. Fig. 14 is a plan view thereof. Fig. 15 is a face or front view of the same. Fig. 16 is an enlarged detail view in elevation of one of the pinions for operating the type-carrying wheels. Fig. 17 is a plan view thereof, showing a portion of its shaft. Fig. 18 is a face view of a movable key-guide and its cams and a portion of the front plate of the operating mechanism. Fig. 19 is a sectional view taken on line 19 19 of Fig. 18. Fig. 20 is a perspective view of one of the operating-keys. Fig. 21 is a view in elevation of a portion of the register and a clock mechanism for operating the same. Fig. 22 is a plan sectional view taken on line 22 22 of Fig. 21, showing the driving-shaft, printing-wheels, and driving-gears. Fig. 23 is a detail view of a portion of the printing-wheels in section, showing their connections with the pinions. Fig. 24 is a perspective view of a portion of one of the printing-wheels, showing it about to engage the projections on one of the pinions. Fig. 25 is a perspective view of one of the printing-wheels on the driving-shaft, showing the indicating-lever in position to receive a blow from one of the hammers. Fig. 26 is a view in side elevation of a part of the lower portion of the register, showing the keyhole structure, its hammers, and connections in their normal positions to receive the key; and Fig. 27 is a similar view of a part of the register, showing the key structure, its cam, and the levers in position to be released to cause the hammers to strike.

Similar letters refer to like parts throughout the different views of the drawings.

A represents the front plate, and A' the rear plate, of the frame, within and to which is secured the operating mechanism of my device. These plates are made of any suitable size, form, and material, but preferably of metal, and are placed, as shown in Figs. 5 and 6, parallel with each other.

Near the central part of the frame, which is composed of the plates A and A', is located a driving-shaft B, which has its bearings in said plates and engages at its rear end with a clock mechanism for the operation of the device, a portion of which clock mechanism $A^{10}$ is shown in Fig. 21 of the drawings, and may be of the ordinary or any preferred construction, and is connected to the driving-shaft B, to which it imparts power, by means of a supplemental driving-shaft $B^{10}$, having at its end adjacent to the driving-shaft B a beveled gear $B^{11}$ to engage the beveled gear $B^{12}$ on the shaft B. On this driving-shaft is mounted and fixedly secured thereto a type-carrying minute-wheel C, which is provided on its periphery with the numerals from "1" to "60," inclusive, and is formed or provided on the face side of its periphery, or on the side adjacent to the hour-wheel D, with two projections $c$, which are adapted to engage with a pinion C', which is loosely mounted upon a shaft $c'$, journaled in the plates A and A', near the periphery of the wheel C. On the shaft B is loosely mounted another type-carrying wheel D, which is provided on its periphery with numbers from "1" to "12," inclusive, to indicate the hours of the day, and on the rear side of its periphery, or that side adjacent to the minute-wheel C, with a number of cogs or teeth $d$ to engage the teeth $c^2$ on one of the pinions C'. Near the hour-wheel D, and in front thereof, is loosely mounted on the shaft B still another type-carrying wheel E, which for identification is called the "day-wheel," and is formed or provided on its periphery with numbers from "1" to "31," inclusive, to indicate the days of the month.

The wheel E has on the rear side of its periphery, or that side thereof adjacent to the hour-wheel D, cogs or teeth $e$ to engage with the teeth of another pinion $C^2$, which is of the same construction and formed as the before-mentioned pinion, with the exception that it is provided with more teeth or cogs. The pinions C' and $C^2$ are loosely mounted on the same shaft $c'$ and are provided with alternating short and long teeth $c^2$ and $c^3$, the former of which engages with the cogs or teeth $d$ and $e$, respectively, on the wheels D and E, and the latter-named teeth $c^3$ with the projections $c$ and $c^5$ on the face sides of the wheels C and D, as will be presently explained.

To the upper portion of the plates forming the frame is journaled a roller F, upon which is wound the paper ribbon F', which passes from said roller over another roller $F^2$, and then vertically past and alongside the peripheries of the wheels C, D, and E to near the bottom of the plates, and thence between the rollers $F^3$ and $F^4$, which are preferably covered with rubber or a similar substance to cause them to clamp the ribbon and to unwind it from the roller F, upon which it is wound before being used.

In Fig. 1 of the drawings the course taken by the ribbon F' is clearly shown. The front end of the shaft $f$, upon which the roller $F^3$ is mounted, is provided with a ratchet $F^4$, which is operated by means of a spring-actuated pawl $f'$, which is pivotally secured to the lower end of the cam-lever G, which cam-lever is fulcrumed, as at $g$, to the plate A, and is operated by means of one of the cams on the key-guide.

Just above the type-carrying wheels C, D, and E, and having its bearings in the plates A and A', is located a roller H, upon which is wound the ink-ribbon $h$, which passes down alongside the periphery of said type-carrying wheels and engages or is attached at its other end to another roller H', journaled below them and on the frame.

To the front or face ends of the shafts $h'$, upon which the rollers H and H', respectively, are mounted, are secured ratchets $H^2$, which are operated by spring-actuated pawls $h^2$, which are pivotally secured to the cam-lever G, as is clearly shown in Fig. 1 of the drawings.

In the upper portion of the frame is journaled a shaft K, to which are secured a number of flexible pieces $k$, which extend downward to a proper point to contact with the peripheries of the wheels C, D, and E and have their ends provided with hammers $i$, which may be provided with cushions on their surfaces adjacent to the wheels in order to prevent injury to the type thereof.

To the front end of the shaft K is secured an arm K', to the upper portion of which is attached a bell-clapper $K^2$, which is adapted to strike the bell $K^3$, which is secured to the upper portion of the plate A, as is illustrated. The rear end of the shaft K has secured thereto a spring $K^4$ to retract the same.

To the plate A and near the side of the shaft $h'$ of the roller H is fulcrumed a lever L, which is provided at its lower end with a cam enlargement $l$ for engagement with the cam M of the key-guide. The upper end of the lever L is provided with a pin or projection $l'$, which engages with the upper portion of the arm K' and causes it to assume the position indicated by dotted lines in Fig. 4, thus raising the flexible pieces $k$, carrying the hammers $i$, from the peripheries of the wheels, from which position the said arm and pieces are instantly liberated by reason of the action of the cam M of the key-guide on the cam enlargement $l$ of the said lever.

Just above the fulcrum-point of the lever L the plate A is provided with a slot $m$, through which projects a pin $m'$, which engages with the lower end of the arm K'. The inner end of the pin $m'$ is secured to a lever $m^2$, which is fulcrumed to the inner surface of the plate A and engages at its lower end with the cam-piece M' of the key-guide and is actuated by means of a spring $m^3$, secured to the inner surface of the plate A, as is clearly shown in Fig. 2 of the drawings.

The key-guide $M^2$ is preferably made in the form of a split tube and has on its portion adjacent to the plate A a circular disk $M^3$, to the outer surface of which is secured a cam-piece M. The tube $M^2$ passes through a hole or opening in the plate A and is provided on its inner end with a cam M', which engages with a pawl $M^4$, pivotally secured to the inner surface of the plate A, which prevents the said cam and guide piece being turned in the opposite direction.

By reference to Figs. 2 and 4 of the drawings it will be seen that the lower portion of the lever $m^2$ also engages with said cam in its revolution. Referring to Figs. 1 and 3 of the drawings, it will be seen and clearly understood that when the key is inserted in the guide-piece and turned therein the cam-piece M will contact with the cam-lever G and at about the same time with the enlargement or cam part $l$ of the lever L, which operation will press the lever G downward and the lever L outward, the movement of the former through its pawls causing the ratchets $F^4$ and $H^2$ to revolve, and consequently their rollers to perform the same operation, and the lever L, being forced outward at its lower end, will press the arm K' into the positions indicated by dotted lines in Figs. 3 and 4 until the cam-piece M shall have passed from the enlargement $l$, when the spring $K^4$ will retract the shaft K, to which are secured the arm K' and the flexible pieces $k$, and cause the hammers on the lower ends of said pieces to strike against the paper and ink ribbons, thus causing the numbers on the peripheries of the wheels to be impressed thereon.

Fulcrumed to the inner surface of the plate A is a lever N, one end of which extends, when in the position shown in Fig. 2, to a line flush with the peripheries of the wheels C, D, and E, so that it may be struck by one of the hammers $i$ and caused to make a mark upon the paper ribbon. This lever may be used to indicate when the employee is going on duty or leaving his work. For instance, if going on duty he will raise the lever to the position shown in Figs. 2 and 25, when the other end will contact with the hammers, and if quitting work he may lower the lever, when its other end will be withdrawn from the hammers and no mark made upon the ribbon, as shown by dotted lines in Fig. 25 of the drawings.

In Figs. 10, 11, and 12 I have shown the hour-wheel provided with two sets of numbers from "1" to "12," inclusive, which numbers indicate the hours of the day and night.

The minute-wheel C, mounted on the shaft B, by reason of the clock mechanism which is shown in Fig. 21 and which is connected to said shaft, will revolve once every hour, and the projections or teeth $c$ on the face side of its periphery will engage with one of the teeth $c^3$ on the pinion C', which will cause said pinion to partly revolve, which operation will cause one of the teeth $c^2$ to engage a cog $d$ on the rear side of the periphery of the hour-wheel D. When the minute-wheel shall have made twenty-four (24) revolutions, the projections $c^5$ thereon will then engage one of the teeth $c^3$ on the other pinion, which is of the same construction as that shown in Fig. 17, with the exception that the cogs or teeth $c^2$ are more numerous thereon. The partly turning of this pinion will cause one of its teeth $c^2$ to engage the cogs $e$ on the wheel E and cause it to turn one space every one revolution of the hour-wheel. It will therefore be understood that by inserting the key, which is provided at the inner end of its shank with a number, into the key-guide, and thereby turning the same, the hammers $i$ will be caused to strike and press the ink and paper ribbons against the peripheries of the wheels C, D, and E and that portion of the key bearing the number, when an impression thereof will be made upon the paper ribbon, thus indicating the number of the employee, the day, the hour, and minute.

By reference to Figs. 1, 2, 4, 18, and 19 it will be seen that the disk $M^3$, plate A, and cam M' are each provided with a slot through which the projection on the key bearing the number of the employee will project, and that the slots in the said three pieces must be brought into alinement before the key can be inserted or withdrawn.

I claim—

1. In an employee's time-register, the combination of the operating mechanism substantially as described, with a slotted key-guide, a slotted disk provided on its exterior surface with a cam, and fixed to said guide, a slotted cam M', fixed on the inner portion of the key-guide, the levers L, and G, to engage the exterior cam, and adapted to cause the hammers to strike and press the ribbons against the type-wheels, and the lever $m^2$, to engage the cam M', to prevent the removal of the key and its reversal, substantially as described.

2. In an employee's time-register, the combination with the operating mechanism substantially as described, of a slotted key-guide, a slotted disk provided with a cam and fixed to said guide, the lever G, adapted to engage the cam to cause the paper and ink ribbon to move a certain distance, substantially as described.

3. In an employee's time-register, the combination with the operating mechanism substantially as described, of a key-guide, having an exterior cam, the cam-levers L, and G, adapted to engage the cam on the key-guide thereby causing the paper and ink ribbons to be shifted and the hammers to strike and press the same against the type-bearing devices, and an internal cam secured on the key-guide to prevent the key being withdrawn till turned completely around, substantially as described.

ERIC W. LINDENAU.

Witnesses:
CHAS. C. TILLMAN,
E. A. DUGGAN.